United States Patent
Kondoh et al.

(10) Patent No.: US 11,537,199 B2
(45) Date of Patent: Dec. 27, 2022

(54) ANIMATION PRODUCTION SYSTEM

(71) Applicant: AniCast RM Inc., Minato-ku (JP)

(72) Inventors: Yoshihito Kondoh, Chuo-ku (JP); Masato Murohashi, Tokyo (JP)

(73) Assignee: ANICAST RM INC., Minato-Ku (JP)

( * ) Notice: Subject to any disclaimer, the term of this patent is extended or adjusted under 35 U.S.C. 154(b) by 0 days.

(21) Appl. No.: 17/008,150

(22) Filed: Aug. 31, 2020

(65) Prior Publication Data

US 2022/0035447 A1  Feb. 3, 2022

(30) Foreign Application Priority Data

Jul. 29, 2020 (JP) .............................. JP2020-128302

(51) Int. Cl.
| | |
|---|---|
| *G06F 3/01* | (2006.01) |
| *G06F 3/0346* | (2013.01) |
| *G06T 13/40* | (2011.01) |
| *H04N 5/222* | (2006.01) |
| *G06T 13/80* | (2011.01) |

(52) U.S. Cl.
CPC .............. *G06F 3/012* (2013.01); *G06F 3/011* (2013.01); *G06F 3/0346* (2013.01); *G06T 13/40* (2013.01); *G06T 13/80* (2013.01); *H04N 5/2224* (2013.01)

(58) Field of Classification Search
CPC ........ G06F 3/012; G06F 3/011; G06F 3/0346; G06F 1/163; G06F 3/0325; G06T 13/80; G06T 13/40; G06T 2200/24; H04N 5/2224; A63F 13/525
See application file for complete search history.

(56) References Cited

U.S. PATENT DOCUMENTS

| | | | | |
|---|---|---|---|---|
| 2008/0267459 | A1* | 10/2008 | Nakada | G09B 19/00 382/118 |
| 2009/0300513 | A1* | 12/2009 | Nims | A63F 13/5258 715/747 |
| 2009/0309891 | A1* | 12/2009 | Karkanias | A63F 13/79 345/581 |
| 2009/0325701 | A1* | 12/2009 | Andres Del Valle | A63F 13/65 463/36 |
| 2018/0256976 | A1* | 9/2018 | McHale | A63F 13/24 |
| 2018/0322681 | A1* | 11/2018 | Inomata | A63F 13/35 |
| 2019/0197819 | A1* | 6/2019 | Caputo | G07F 17/3244 |
| 2019/0240573 | A1* | 8/2019 | Kondoh | A63F 13/25 |
| 2019/0325633 | A1* | 10/2019 | Miller, IV | G06F 3/011 |

FOREIGN PATENT DOCUMENTS

JP  2017146651 A  8/2017

* cited by examiner

*Primary Examiner* — Mihir K Rayan

(57) ABSTRACT

To enables you to take animations in a virtual space, an animation production system comprising: a virtual camera that shoots a character placed in a virtual space; a user input detection unit that detects an input of a user from at least one of a head mounted display and a controller which the user mounts; a character control unit that controls an action of the character in response to the input; and a preset storage unit that stores an expression of the character, wherein the character control unit sets the expression corresponding to the input that does not affect the action of the character to the character.

3 Claims, 7 Drawing Sheets

ANIMATION PRODUCTION SYSTEM

TECHNICAL FIELD

The present invention relates to an animation production system.

BACKGROUND ART

Virtual cameras are arranged in a virtual space (see Patent Document 1).

CITATION LIST

Patent Literature

[PTL 1] Patent Application Publication No. 2017-146651

SUMMARY OF INVENTION

Technical Problem

No attempt was made to capture animations in the virtual space.

The present invention has been made in view of such a background, and is intended to provide a technology capable of capturing animations in a virtual space.

Solution to Problem

The principal invention for solving the above-described problem is an animation production system comprising: a virtual camera that shoots a character placed in a virtual space; a user input detection unit that detects an input of a user from at least one of a head mounted display and a controller which the user mounts; a character control unit that controls an action of the character in response to the input; and a preset storage unit that stores an expression of the character, wherein the character control unit sets the expression corresponding to the input that does not affect the action of the character to the character.

The other problems disclosed in the present application and the method for solving them are clarified in the sections and drawings of the embodiments of the invention.

Advantageous Effects of Invention

According to the present invention, animations can be captured in a virtual space.

DESCRIPTION OF EMBODIMENTS

Figure 1:
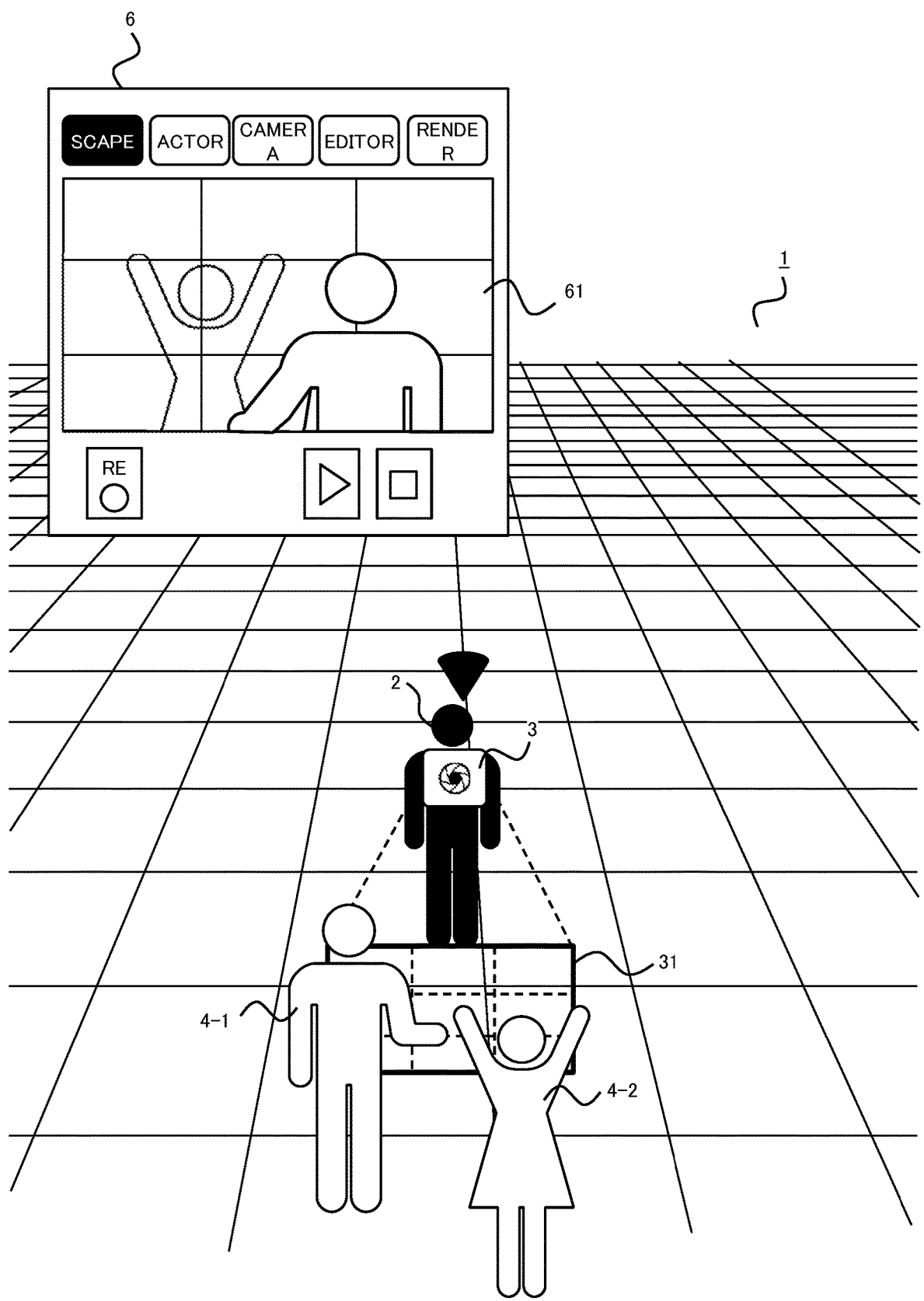
FIG. 1 is a diagram illustrating an example of a virtual space displayed on a head mount display (HMD) mounted by a user in an animation production system 300 of the present embodiment.

The contents of embodiments of the present invention will be described with reference. The present invention includes, for example, the following configurations.

[Item 1]

An animation production system comprising:

a virtual camera that shoots a character placed in a virtual space;

a user input detection unit that detects an input of a user from at least one of a head mounted display and a controller which the user mounts;

a character control unit that controls an action of the character in response to the input; and a preset storage unit that stores an expression of the character, wherein the character control unit sets the expression corresponding to the input that does not affect the action of the character to the character.

[Item 2]

The animation production system according to claim 1, wherein the character control unit registers the expression of the character created by the action of the character in the preset storage unit.

[Item 3]

The animation production system according to claim 1, wherein the character control unit sets the expression to the character in response to an instruction from another user that is different from the user.

A specific example of an animation production system 300 according to an embodiment of the present invention will be described below with reference to the drawings. It should be noted that the present invention is not limited to these examples, and is intended to include all modifications within the meaning and scope of equivalence with the appended claims, as indicated by the appended claims. In the following description, the same elements are denoted by the same reference numerals in the description of the drawings and overlapping descriptions are omitted.

Overview

FIG. 1 is a diagram illustrating an example of a virtual space displayed on a head mount display (HMD) mounted by a user in an animation production system 300 according to the present embodiment. In the animation production system 300 of the present embodiment, a virtual character 4 and a virtual camera 3 are disposed in the virtual space 1, and a character 4 is shot using the camera 3. In the virtual space 1, a photographer 2 (a photographer character) is disposed, and the camera 3 is virtually operated by the photographer 2. In the animation production system 300 of this embodiment, as shown in FIG. 1, the user arranges the character 4 and the camera 3 while viewing the virtual space 1 from a bird's eye (Third Person's View), shoots the character 4 using the FPV (First Person View) as the photographer 2, and performs the performance of the character 4 using the FPV, while producing the animation. In the virtual space 1, a plurality of characters 4 (in the example of FIG. 1, characters 4-1 and 4-2) can be disposed, and the user can perform the performance while possessing a character 4. If more than one character 4 is disposed, the user may also switch the object possessed by each character 4 (e.g., characters 4-1 and 4-2). That is, in the animation production system 300 of the present embodiment, one can play a number of roles (roles). In addition, since the camera 2 can be virtually operated as the photographer 2, natural camera work can be realized and the representation of the movie to be shot can be enriched.

<General Configuration>

Figure 2:
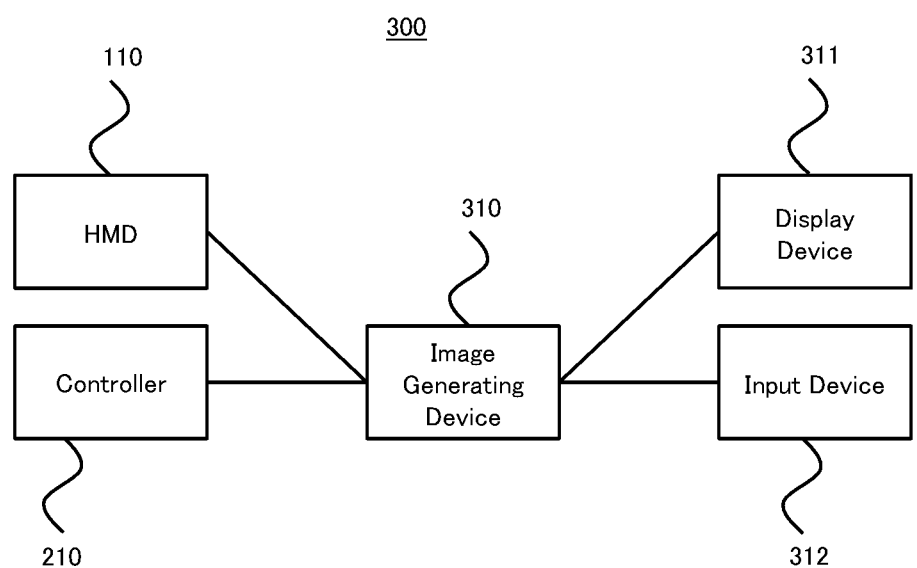
FIG. 2 is a diagram illustrating an example of the overall configuration of an animation production system 300 according to an embodiment of the present invention.

FIG. 2 is a diagram illustrating an example of the overall configuration of an animation production system 300 according to an embodiment of the present invention. The animation production system 300 may comprise, for example, an HMD 110, a controller 210, and an image generating device 310 that functions as a host computer. The image generating device 310 may include a display device 311, such as a display, and an input device 312, such as a keyboard, mouse, or touch panel. An infrared camera (not shown) or the like can also be added to the animation production system 300 for detecting the position, orientation and slope of the HMD 110 or controller 210. These devices may be connected to each other by wired or wireless means. For example, each device may be equipped with a USB port to establish communication by cable connection, or communication may be established by wired or wireless, such as HDMI, wired LAN, infrared, Bluetooth™, WiFi™. The image generating device 310 may be a PC, a game machine, a portable communication terminal, or any other device having a calculation processing function.

<HMD110>

Figure 3:
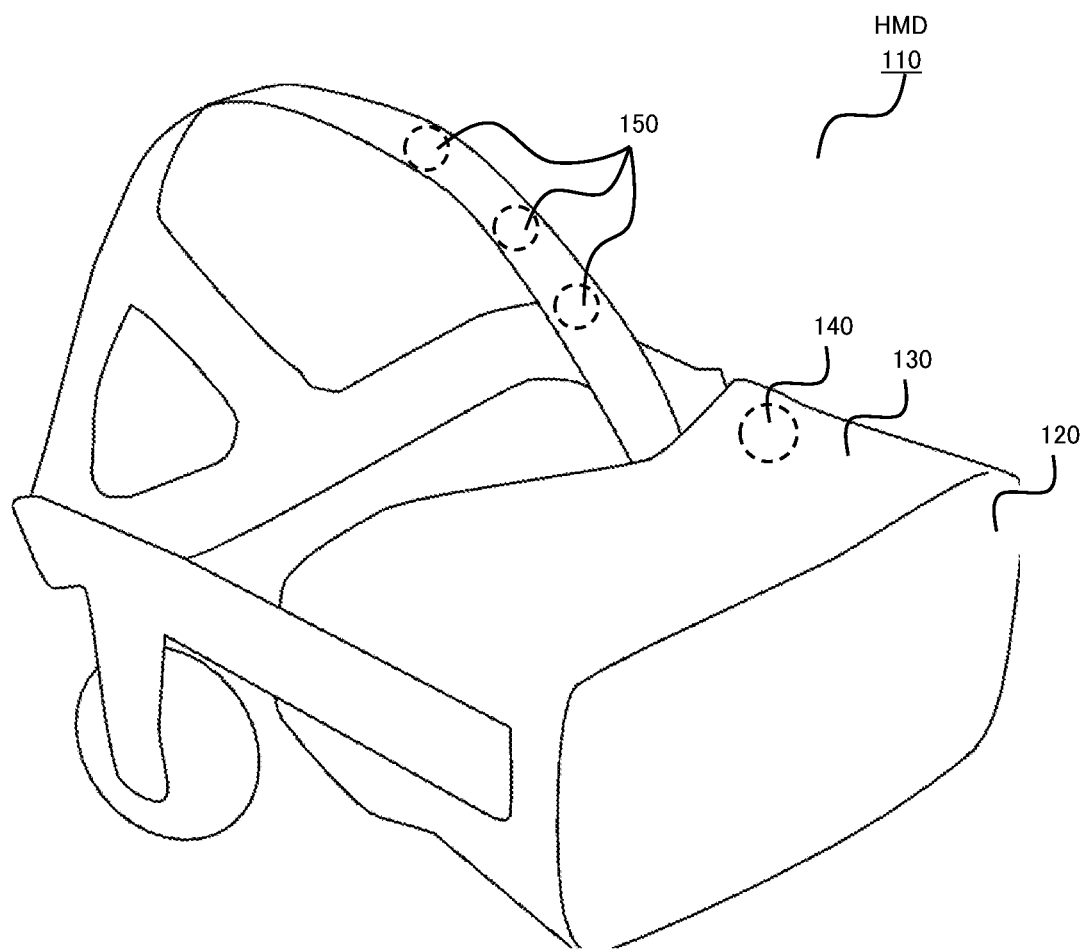
FIG. 3 is a diagram schematically illustrating the appearance of the HMD 110 according to the present embodiment.
Figure 4:
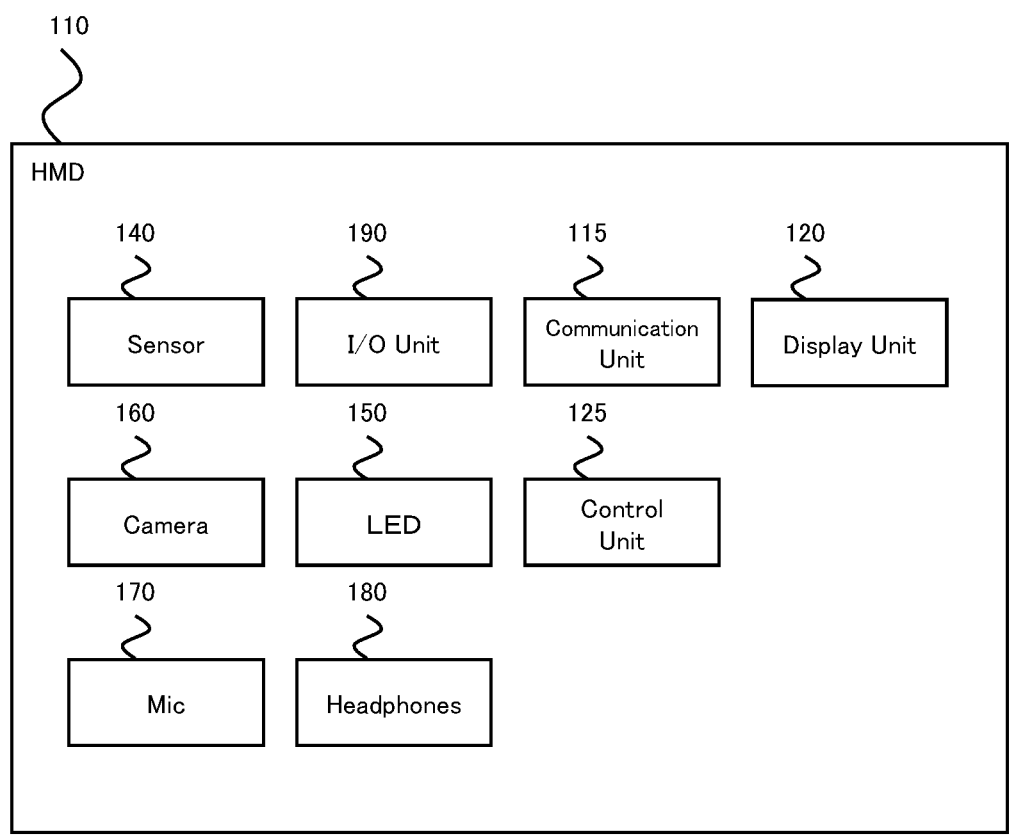
FIG. 4 is a diagram illustrating an example of a functional configuration of the HMD 110 according to the present embodiment.

FIG. 3 is a diagram schematically illustrating the appearance of the HMD 110 according to the present embodiment. FIG. 4 is a diagram illustrating an example of a functional configuration of the HMD 110 according to the present embodiment.

The HMD 110 is mounted on the user's head and includes a display panel 120 for placement in front of the user's left and right eyes. Although the display panel 120 may be an optically transmissive or non-transmissive display, the present embodiment illustrates a non-transmissive display panel that can provide more immersion. The display panel 120 displays a left-eye image and a right-eye image, which can provide the user with a three-dimensional image by utilizing the visual difference of both eyes. If left- and right-eye images can be displayed, a left-eye display and a right-eye display can be provided separately, and an integrated display for left-eye and right-eye can be provided.

The housing portion 130 of the HMD 110 includes a sensor 140. Sensor 140 may comprise, for example, a magnetic sensor, an acceleration sensor, or a gyro sensor, or a combination thereof, to detect movements such as the orientation or tilt of the user's head. When the vertical direction of the user's head is Y-axis, the axis corresponding to the user's anteroposterior direction is Z-axis, which connects the center of the display panel 120 with the user, and the axis corresponding to the user's left and right direction is X-axis, the sensor 140 can detect the rotation angle around the X-axis (so-called pitch angle), rotation angle around the Y-axis (so-called yaw angle), and rotation angle around the Z-axis (so-called roll angle).

In place of or in addition to the sensor 140, the housing portion 130 of the HMD 110 may also include a plurality of light sources 150 (e.g., infrared light LEDs, visible light LEDs). A camera (e.g., an infrared light camera, a visible light camera) installed outside the HMD 110 (e.g., indoor, etc.) can detect the position, orientation, and tilt of the HMD 110 in a particular space by detecting these light sources. Alternatively, for the same purpose, the HMD 110 may be provided with a camera for detecting a light source installed in the housing portion 130 of the HMD 110.

The housing portion 130 of the HMD 110 may also include an eye tracking sensor. The eye tracking sensor is used to detect the user's left and right eye gaze directions and gaze. There are various types of eye tracking sensors. For example, the position of reflected light on the cornea, which can be irradiated with infrared light that is weak in the left eye and right eye, is used as a reference point, the position of the pupil relative to the position of reflected light is used to detect the direction of the eye line, and the intersection point in the direction of the eye line in the left eye and right eye is used as a focus point.

<Controller 210>

Figure 5:
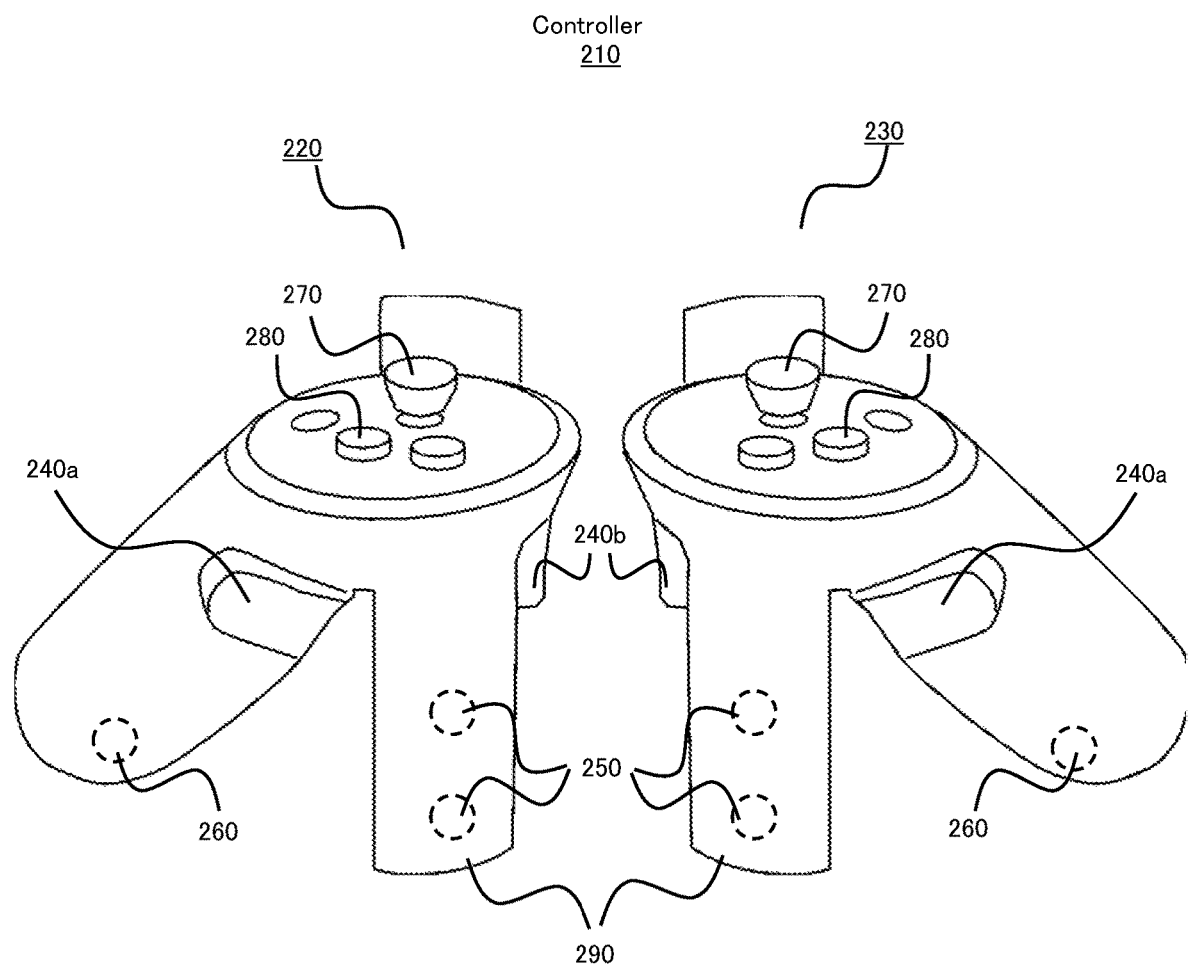
FIG. 5 is a diagram schematically illustrating the appearance of the controller 210 according to the present embodiment.
Figure 6:
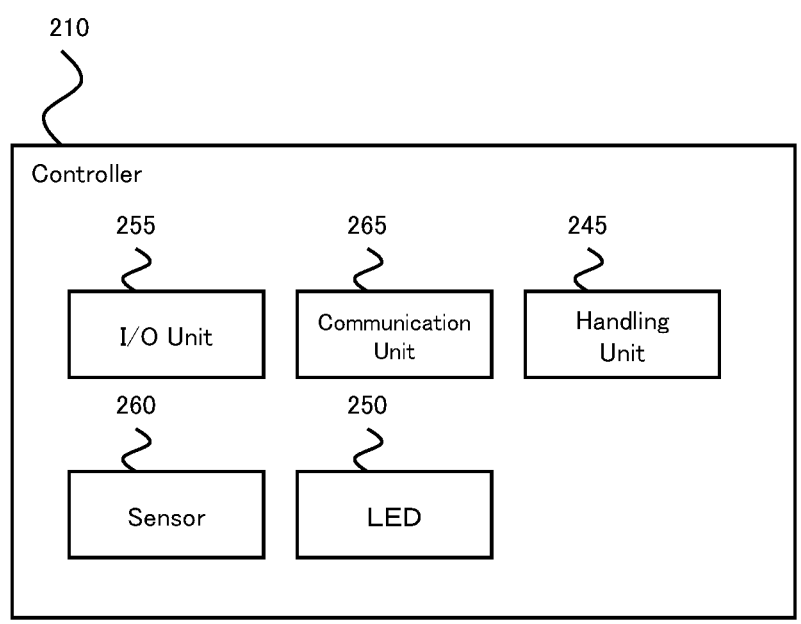
FIG. 6 is a diagram illustrating an example of a functional configuration of a controller 210 according to the present embodiment.

FIG. 5 is a diagram schematically illustrating the appearance of the controller 210 according to the present embodiment. FIG. 6 is a diagram illustrating an example of a functional configuration of a controller 210 according to this embodiment.

The controller 210 can support the user to make predetermined inputs in the virtual space. The controller 210 may be configured as a set of left-hand 220 and right-hand 230 controllers. The left hand controller 220 and the right hand controller 230 may each have an operational trigger button 240, an infrared LED 250, a sensor 260, a joystick 270, and a menu button 280.

The operation trigger button 240 is positioned as 240a, 240b in a position that is intended to perform an operation to pull the trigger with the middle finger and index finger when gripping the grip 235 of the controller 210. The frame 245 formed in a ring-like fashion downward from both sides of the controller 210 is provided with a plurality of infrared LEDs 250, and a camera (not shown) provided outside the controller can detect the position, orientation and slope of the controller 210 in a particular space by detecting the position of these infrared LEDs.

The controller 210 may also incorporate a sensor 260 to detect movements such as the orientation and tilt of the controller 210. As sensor 260, it may comprise, for example, a magnetic sensor, an acceleration sensor, or a gyro sensor, or a combination thereof. Additionally, the top surface of the controller 210 may include a joystick 270 and a menu button 280. It is envisioned that the joystick 270 may be moved in a 360 degree direction centered on the reference point and operated with a thumb when gripping the grip 235 of the controller 210. Menu buttons 280 are also assumed to be operated with the thumb. In addition, the controller 210 may include a vibrator (not shown) for providing vibration to the hand of the user operating the controller 210. The controller 210 includes an input/output unit and a communication unit for outputting information such as the position, orientation, and slope of the controller 210 via a button or a joystick, and for receiving information from the host computer.

With or without the user grasping the controller 210 and manipulating the various buttons and joysticks, and with information detected by the infrared LEDs and sensors, the system can determine the movement and attitude of the user's hand, pseudo-displaying and operating the user's hand in the virtual space.

<Image Generator 310>

Figure 7:
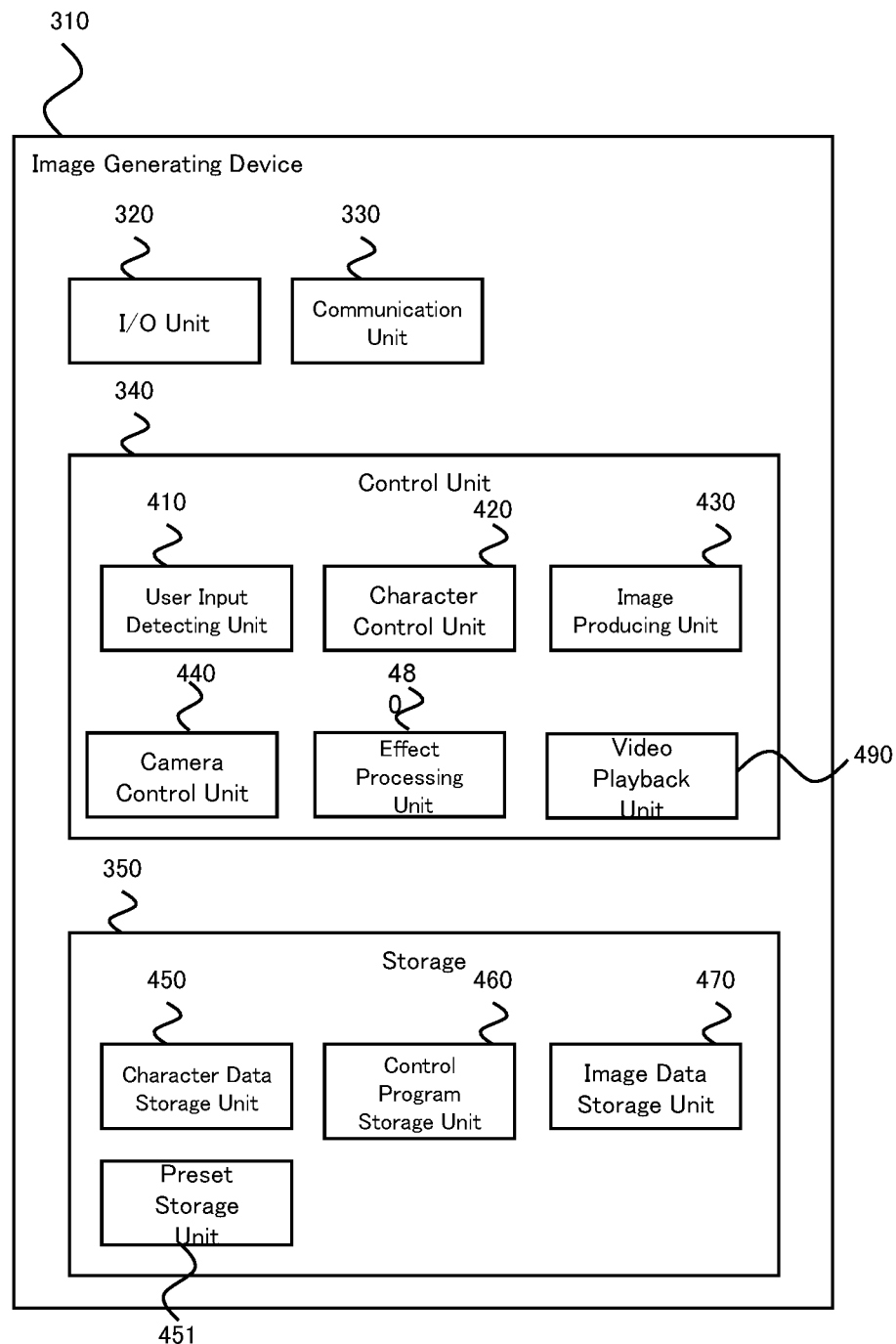
FIG. 7 is a diagram illustrating a functional configuration of an image producing device 310 according to the present embodiment.

FIG. 7 is a diagram illustrating a functional configuration of an image producing device 310 according to the present embodiment. The image producing device 310 may use a device such as a PC, a game machine, a portable communication terminal, or the like, which has a function for storing information on the user's head movement or the movement or operation of the controller acquired by the user input information or the sensor, which is transmitted from the HMD 110 or the controller 210, performing a predetermined computational processing, and generating an image. The image producing device 310 may include an input/output unit 320 for establishing a wired connection with a peripheral device such as, for example, an HMD 110 or a controller 210, and a communication unit 330 for establishing a wireless connection such as infrared, Bluetooth, or WiFi (registered trademark). The information received from the HMD 110, the controller 210, and/or the input device 311 regarding the movement of the user's head or the movement or operation of the controller 210 is detected in the control unit 340 as input content including the operation of the user's position, line of sight, attitude, speech, operation, etc., and a control program stored in the storage unit 350 is executed in accordance with the user's input content to perform a process such as controlling the character 4 and generating an image. The user input detecting unit 410 may also receive input from an input device 312, such as a keyboard or a mouse. The control unit 340 may be composed of a CPU. However, by further providing a GPU specialized for image processing, information processing and image processing can be distributed and overall processing efficiency can be improved. The image generating device 310 may also communicate with other computing processing devices to allow other computing processing devices to share information processing and image processing.

The control unit 340 includes a user input detecting unit 410 that detects information received from the HMD 110 and/or the controller 210 regarding the movement of the user's head and the movement or operation of the controller, a character control unit 420 that executes a control program stored in the control program storage unit 460 for a character 4 stored in the character data storage unit 450 of the storage unit 350, a camera control unit 440 that controls the virtual camera 3 disposed in the virtual space 1 according to the character control, and an image producing unit 430 that generates an image in which the camera 3 captures the virtual space 1 based on the character control. Here, the movement of the character 4 is controlled by converting information such as the direction, inclination, and hand movement of the user head detected through the HMD 110 or the controller 210 into the movement of each part of the bone structure created in accordance with the movement or restriction of the joints of the human body, and applying the bone structure movement to the previously stored character data. The control of the camera 3 is performed, for example, by changing various settings for the camera 3 (for example, the position within the virtual space 1 of the camera 3, the viewing direction of the camera 3, the focus position, the zoom, etc.) depending on the movement of the hand of the character 4. The image producing unit 430 registers the action data representing the movement of the character 4 controlled by the character control unit 420 and the movement (operation) of the camera 3 controlled by the camera control unit 440 in the image data storage unit 470, and generates an image in which the movement of the character 4 is virtually captured by the camera 3. The image producing unit 430 is displayed on the display unit 61 of the control panel 6 disposed in the virtual space 1 and can also be displayed on the display device 311. Further, the image producing unit 430 may display the generated image on a display portion (not shown) provided by the camera 3.

The storage unit 350 stores in the aforementioned character data storage unit 450 information related to the character 4, such as the attribute of the character 4, as well as the image data of the character 4. The control program storage unit 460 controls the operation and expression of the character 4 in the virtual space and stores a program for controlling an object such as the camera 3. The image data storage unit 470 stores the image generated by the image producing unit 430. In this embodiment, the image stored in the image data storage unit 470 can be an action data for generating a moving image. The action data may include, for example, 3D data for displaying the character 4 in the virtual space 1, pause data for identifying the bone structure of the 3D data, motion data for identifying the movement of the bone structure, and the like. Further, the image producing unit 430 may create (render) a dynamic image based on the action data and register the dynamic image data as a result of rendering in the image data storage unit 470.

<Movie Post Effect>

The control unit 340 also includes an effect processing unit 480 for applying an effect to the movie. The effect processing unit 480 adds an effect to the pixel of the movie (two-dimensional moving image) generated by the image producing unit 430, rather than a simulation process in which the rendering is performed considering the light source, etc. in the virtual space 1. Effects can employ processing that is applicable to any two-dimensional dynamic image. Effects may include, for example, Bloom effects, Depth of Field effects, Bignetting effects, Color Grading effects, Color Curve effects, diffusion filters, and the like, and the like. Parameters are set for the effect. Parameters may be entered, for example, from an input device 312, such as a keyboard or mouse.

The effect processing unit 480 can accept the designation of the type of effect, accept the parameters of the specified effect, and perform the effect processing on the dynamic image based on the accepted parameters. For example, when a flare effect is selected, the effect processing unit 480 may accept the central position, size, color, or the like of the flare as a parameter. The position at which the effect is applied may be set, for example, by the user via an input device 312, such as a mouse. In addition, the selection of an effect or the input of a parameter may be performed in the virtual space 1. For example, the control panel 6 may provide a selection section of an effect or a setting section of a parameter.

<Storing Presets>

The storage unit 350 may further comprise a preset storage unit 451. The preset storage 451 may record various preset parameters.

The preset storage unit 451 may store the parameters relating to the post effects provided by the effect processing unit 480 as presets. The effect processing unit 480 can accept a designation from the user and perform the effect processing using the parameters of the specified preset. The preset stored in the preset storage unit 451 can also be called and applied after fine adjustment. In this case, the effect processing unit 480 may, for example, display preset parameters on a control panel, accept adjustments from the user for each parameter, and perform an effect processing.

In addition, the preset storage unit 451 may store the expression of the character 4 as a preset. The preset storage unit 451 may, for example, store as a preset parameters that deform the model of the face of the character 4 for each of the plurality of facial expressions. The character control unit 420 can change the expression of the character 4 by, for example, reading out a different expression from the preset storage unit 451 according to a button or movement of the controller 210 and applying it to the character 4. Accordingly, since a user can set an expression using a controller 210 or the like while acting on a character 4, it is not necessary, for example, to recognize a face by the HMD 110, and the user can concentrate only on the movement of the body of the character 4. For example, a preset of facial expression may be created in the virtual space 1 by a user through operation of the HMD 110 or the controller 210 and the created facial expression of the character 4 may be stored in the preset storage unit 451. In addition, when performing the modeling of the character 4 in advance, a plurality of expressions may be created and stored in the preset storage unit 451.

The application of the preset expression to the character 4 may be performed by another user different from the user acting on the character 4. In this case, another user can select an expression while watching the movement of the character 4 and apply an expression to the character 4 by specifying a timing.

The preset storage unit 451 also stores a preset of the body movement (action) of the character 4, and the character control unit 420 may apply a different movement depending on, for example, the buttons or movements of the controller 210. For example, by pressing a button on the controller 210, predetermined pauses or preset action can be performed. Accordingly, for a character 4 having a specific decision pose or decision action, for example, the user who is the performer may cause the character 4 to assume a predetermined posture or perform a predetermined operation without each pause or action.

In addition, the preset of the action can be a one-cut operation, as well as a short operation. Multiple take actions may be recorded.

As described above, according to the animation production system 300 of the present exemplary embodiment, a user can operate the camera 3 as the camera man 2 in the virtual space 1 to take video images. Accordingly, since the camera 3 can be operated in the same way as in the real world to take photographs, it is possible to realize a natural camera work and to provide a richer representation of the animated video.

Further, according to the animation production system 300 of the present embodiment, an image resulting from an effect processing can be displayed on a display unit 61 in a display device 311 and/or a virtual space 1 for an image generated by the image producing unit 430. This allows the user to create an animation while viewing the final results applied to the effect.

In the animation production system 300 of the present embodiment, the display device 311 and the input device 312 disposed outside the virtual space can be used to select the type of effect to be processed by the effect processing unit 480 and to accept the input of the parameters of the effect. Therefore, the author who operates the character 4 or camera 3 and the author who adjusts the effect can work independently. In other words, animation production can be performed by separating the producers responsible for performance and camera work from the producers responsible for the final quality adjustment of the video.

Although the present embodiment has been described above, the above-described embodiment is intended to facilitate the understanding of the present invention and is not intended to be a limiting interpretation of the present invention. The present invention may be modified and improved without departing from the spirit thereof, and the present invention also includes its equivalent.

For example, in the present embodiment, the image generating device 310 may be a single computer, but not limited to the HMD 110 or the controller 210 may be provided with all or some of the functions of the image generating device 310. It may also include a function of a portion of the image generating device 310 to other computers that are communicatively connected with the image generating device 310.

In the present exemplary embodiment, a virtual space based on the virtual reality (VR; Virtual Reality) was assumed. However, the animation production system 300 of the present exemplary embodiment is not limited to an extended reality (AR; Augmented Reality) space or a complex reality (MR; Mixed Reality) space, but the animation production system 300 of the present exemplary embodiment is still applicable.

In the present embodiment, the grid 31 is divided into three sections, vertically and horizontally, but a dividing line 32 that is divided in any number can be displayed.

In the present embodiment, the user possessed by the camera man 2 or the character 4 performs an operation to adjust the position of the grid 31. However, the position of the grid 31 may be adjusted in a state where the virtual space 1 is overviewed (the user is not possessed by the camera man 2 or the character 4). In this case, the user can grasp and move the grid 31.

EXPLANATION OF SYMBOLS 1 virtual space
2 cameraman
3 cameras
4 characters
6 control panel
7 Screens
31 Grid
32 split line
61 display
71 display
72 playback button
110 HMD
120 display panel
130 housing
140 sensor
150 light source
210 controller
220 left hand controller
230 right hand controller
235 grip
240 trigger button
250 Infrared LED
260 sensor
270 joystick
280 menu button
300 Animation Production System
310 Image Generator
311 display
312 input device
320 I/O portion
330 communication section
340 controller
350 storage
410 User Input Detector
420 character control unit
430 Image Generator
440 Camera Control
450 character data storage section 451 Preset Storage
460 Program Storage
470 Image Data Storage
490 Movie Playback

The invention claimed is:

1. An animation production system comprising:
a virtual camera that shoots a character placed in a virtual space;
a user input detection unit that detects a first input of a user from at least one of a head mounted display and a controller which the user mounts;
a character control unit that controls an action of the character in response to the first input; and
a preset storage unit that stores a facial expression of the face of the character,
wherein the character control unit sets the facial expression corresponding to a second input from the user, wherein the second input does not affect the action of the character, wherein the second input is from a button of the controller or a movement of the controller.

2. The animation production system according to claim 1, wherein
the character control unit registers the facial expression of the character created by the action of the character in the preset storage unit.

3. The animation production system according to claim 1, wherein
the character control unit sets the facial expression to the character in response to an instruction from another user that is different from the user.

* * * * *